United States Patent [19]

Hayashi

[11] Patent Number: 5,495,142
[45] Date of Patent: Feb. 27, 1996

[54] ELECTRO-OPTICAL DEVICE

[75] Inventor: Masatake Hayashi, Kanagawa, Japan

[73] Assignee: Sony Corporation, Tokyo, Japan

[21] Appl. No.: 310,039

[22] Filed: Sep. 22, 1994

Related U.S. Application Data

[63] Continuation of Ser. No. 837,962, Feb. 20, 1992, abandoned.

[30] Foreign Application Priority Data

Feb. 20, 1991 [JP] Japan .................. 3-047783

[51] Int. Cl.⁶ ............................................. H01J 17/58
[52] U.S. Cl. ................ 313/584; 313/586; 313/610; 345/87
[58] Field of Search ........................ 313/484, 495, 313/494, 582, 584, 586, 587, 610; 315/169.3, 169.4; 345/60, 66, 67, 68, 38, 50, 87; 359/36, 48, 55, 80, 37; 365/111, 113

[56] References Cited

U.S. PATENT DOCUMENTS

| | | | |
|---|---|---|---|
| 3,755,027 | 8/1973 | Gilsing | 313/491 X |
| 3,894,264 | 7/1975 | Andoh et al. | 313/586 X |
| 4,048,533 | 9/1977 | Hinson et al. | 313/454 X |
| 4,896,149 | 1/1990 | Buzak et al. | 345/60 |
| 5,107,182 | 4/1992 | Sano et al. | 313/587 X |
| 5,164,633 | 11/1992 | Kim et al. | 313/581 |
| 5,182,489 | 1/1993 | Sano | 313/580 X |

FOREIGN PATENT DOCUMENTS 0217396  8/1989  Japan.

*Primary Examiner*—Walter E. Snow
*Assistant Examiner*—Ashok Patel
*Attorney, Agent, or Firm*—Hill, Steadman & Simpson

[57] ABSTRACT

An electro-optical device with a first substrate that has a plurality of non-overlapping first electrodes on a major surface; and a second substrate which is opposed to the first substrate and has a plurality of non-overlapping second electrodes on a major surface. The second electrodes are disposed at equal intervals and substantially are perpendicular to the first electrodes. The device also has an electro-optical material layer disposed between the first and second substrates and a discharge chamber between the electro-optical material layer and the second substrate which is filled with an ionizable gas. When the electro-optical device is used in an image display device, the number of electrodes for obtaining the resolution can be reduced to one half as compared to conventional devices. A bright image display is provided and the partition walls can be formed by a printing method on the second electrodes.

3 Claims, 5 Drawing Sheets

ELECTRO-OPTICAL DEVICE

This is a continuation of application Ser. No. 07/837,962, filed Feb. 20, 1992, now abandoned.

CROSS-REFERENCE TO RELATED APPLICATION

This application is related to co-pending application Ser. No. 07/837,961, filed Feb. 20, 1992 entitled "Electro-Optical Device in which the inventor is Shigeki Miyazak which is assigned to the assignee of the present application.

1. Background of the Invention

This invention relates to an electro-optical device applied as an image display device to drive an electro-optical material layer by making use of plasma, thus to carry out selection of pixels.

2. Description of Related Art

As the means for allowing, e.g., a liquid crystal display to have high resolution and high contrast, there is generally carried out a method in which active elements such as transistors, etc. are provided every display pixels to drive them (which method is so called an active matrix addressing system).

In this case, however, since it is necessary to provide a large number of semiconductor elements such as thin film transistors, the problem of yield occurs particularly when the display area is enlarged, giving rise to a problem in that the cost is necessarily increased.

Thus, as a means for solving this, Buzaku et al. have proposed in the Japanese Laid Open Application No. 217396/89 publication a method utilizing discharge plasma in place of semiconductor elements such as MOS transistors or thin film transistors, etc. as an active element.

The configuration of an image display device for driving a liquid crystal by making use of discharge plasma will be briefly described.

In this image display device, as shown in FIG. 7, a liquid crystal layer 101 serving as an electro-optical material layer and plasma chambers 102 are adjacently arranged and are separated by a thin dielectric sheet 103 comprised of glass, etc.

The plasma chambers 102 are constituted by forming a plurality of grooves 105 in parallel to each other in a glass substrate or base plate 104. These chambers are filled with an ionizable gas. Further, pairs of electrodes 106 and 107 in parallel to each other are provided in respective grooves 105. These electrodes 106 and 107 function as an anode and a cathode for ionizing gas within the plasma chambers 102 so as to generate discharge plasma.

For example, the electrodes 106 function as anodes, and are commonly wired and grounded. Further, the electrodes 107 function as cathodes, and are connected to transistors through current limiting resistors.

On the other hand, the liquid crystal layer 101 is held by the dielectric sheet 103 and a transparent substrate 108. On the surface at the liquid crystal layer 101 side of the transparent substrate 108, transparent electrodes 109 are formed. These transparent electrodes 109 are perpendicular to the plasma chambers constituted by the grooves 105. The portions where the transparent electrodes 109 and the plasma chambers 102 intersect with each other correspond to pixels.

In the above-mentioned image display device, pulse voltages are applied in sequence to electrodes 107 serving as the cathode by ON/OFF transistors, whereby discharge plasma takes place in a time series manner by discharge between the electrodes 106 and 107 in the respective plasma chambers 102. Then, by switching and scanning in sequence the plasma chambers 102 where plasma discharge is carried out by the ON/OFF of the transistors, and by applying signal voltages to the transparent electrodes 109 on the liquid crystal layer 101 side in synchronism with the switching scan operation, these signal voltages are held by respective pixels. The liquid crystal layer 101 is thus driven.

Accordingly, the grooves 105, i.e., plasma chambers 102 respectively correspond to each scanning line, and two kinds of electrodes comprising an anode and a cathode are required for every scanning unit.

Meanwhile, since image display devices of this kind carry out the operation of an optical shutter in the state where these electrodes 106 and 107 are included in the display region as well, in the case where the electrodes 106 and 107 are formed by, e.g., opaque material such as metal, light at these portions is absorbed or reflected. This is a disadvantage for an effective operation as an optical shutter. The above-mentioned image display devices have a large problem in electrodes 106 and 107 lower the transmissivity or transmission factor, thus degrading the brightness of the image display device.

Accordingly, it is desirable to form these electrodes 106 and 107 of a transparent material, or by a method such as by narrowing the stripe width, etc. thereby reducing the lowering of the transmissivity to a minimum level.

However, because there actually exists the occurrence of a sputter phenomenon followed by a plasma discharge, a metal film such as Ni, etc. must be used as an electrode material.

Further, it is obvious that the method of narrowing the stripe width of the electrodes 106 and 107 has a limit particularly in the case of forming a high resolution and high density pattern in order to avoid occurrence of defects due to breakage during manufacturing or during operation.

As stated above, in the conventional image display devices, improvement in the transmissivity and the requirement of high resolution are contrary to each other.

SUMMARY OF THE INVENTION

The object of the invention is to provide an electro-optical device applied as an image display device, which is capable of improving transmissivity and of providing high resolution without altering the electrode material or the stripe width.

To achieve the above-mentioned object, in accordance with this invention, there is provided an electro-optical device comprising: a first substrate having a plurality of non-overlapping first electrodes on a major surface thereof; a second substrate opposed to the first substrate and having a plurality of non-overlapping second electrodes on a major surface thereof, the second electrodes being disposed substantially perpendicular to the first electrodes, adjacent second electrodes being disposed at equal intervals; an electro-optical material layer disposed between the first and second substrates; and a discharge chamber disposed between the electro-optical material layer and the second substrate, and filled with an ionizable gas.

An electro-optical device may further include a dielectric material layer disposed between the electro-optical material layer and the discharge chamber.

In an electro-optical device, the discharge chamber has a plurality of scanning units, each of the scanning units comprising a discharge region of a localized volume of ionized gas so that at least two scanning units are formed as a continuous space. It is preferable that the discharge region of all scanning units be formed as a continuous space.

Alternatively, each scanning unit may be defined by partition walls formed on the second electrode.

An electro-optical device may further include fine particles on the second electrodes.

In addition, there is provided an addressing structure comprising: a substrate having a plurality of electrodes on a major surface thereof, adjacent electrodes being disposed at equal intervals; a dielectric material layer opposed to the substrate; and an ionizable gas filled between the substrate and the dielectric material layer, the ionizable gas defining a discharge region as an addressing element.

In the electro-optical device of this invention, discharge electrode stripes (second electrodes) are formed at the same pitch as the scanning unit pitch, and respective electrode stripes carry out the function as the anode and the function as the cathode in a time series manner.

Accordingly, the number of electrode stripes required per each scan unit is reduced to one half. Thus, even in the case where resolution is high, transmitivity is ensured.

DESCRIPTION OF THE PREFERRED EMBODIMENT

An embodiment to which this invention is applied will now be described in detail with reference to the attached drawings.

An electro-optical device applied to an image display device employed in this embodiment is of the so called open cell structure in which all discharge regions are formed as a continuous space. Accordingly, there exists no partition walls which partition the discharge region.

Figure 1:
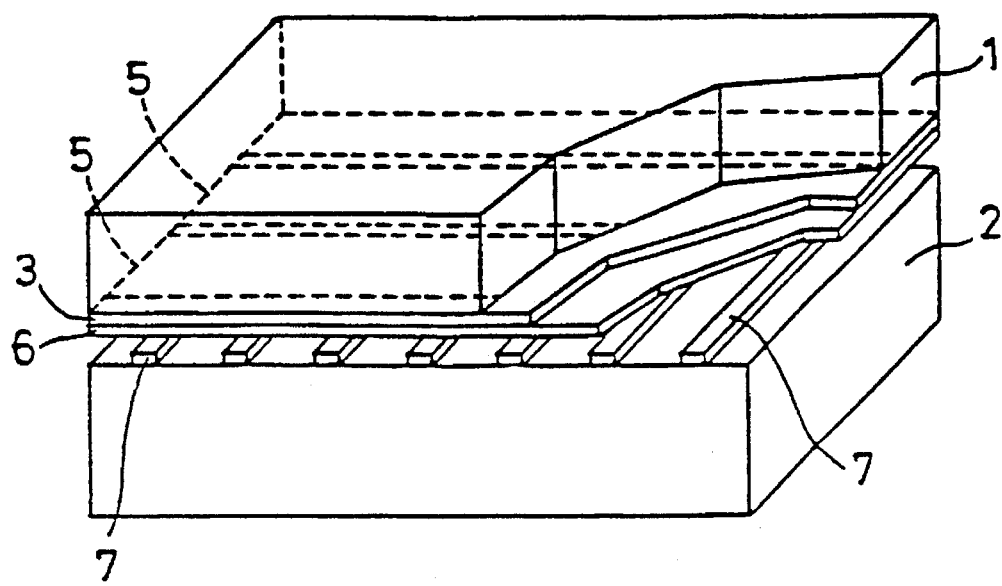
FIG. 1 is an essential part schematic perspective view showing, in a manner partially broken manner, an embodiment, of an image display device to which an electro-optical device according to this invention is applied.
Figure 2:
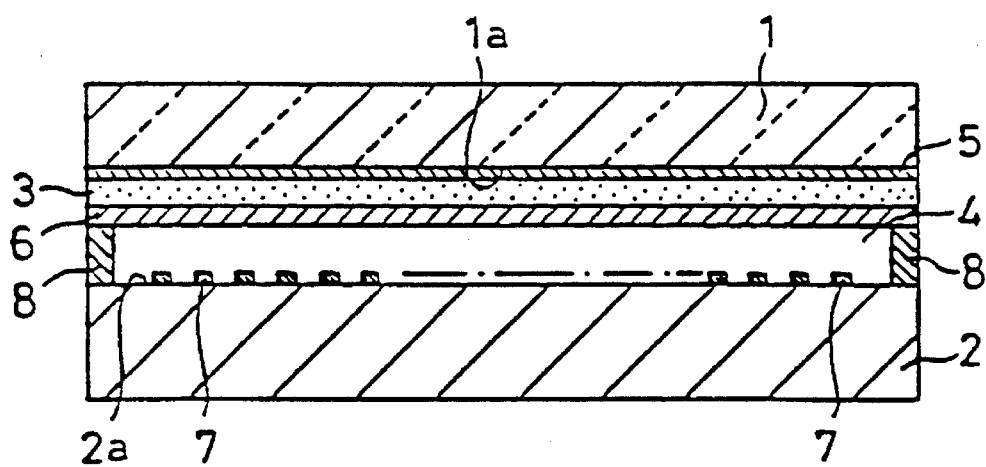
FIG. 2 is an essential part schematic cross sectional view of the embodiment shown in FIG. 1.

The configuration of the electro-optical device applied to an image display device of this embodiment will be first described. In the electro-optical device of this embodiment, as shown in FIGS. 1 and 2, a liquid crystal layer 3 serving as an electro-optical material layer is inserted between a flat and sufficiently optically transparent first base plate 1 and a similarly flat and transparent second base plate 2, and a space between the liquid crystal layer 3 and the second substrate 2 is utilized as a discharge chamber 4.

In this embodiment, these substrates 1 and 2 are both formed by a non-conductive and optically transparent material by taking into consideration the case where the image display device in this embodiment is of the transmission type. However, in the case where the image display device is constructed as a direct-viewing or reflection type display device, it is sufficient that either one of the substrates is transparent.

Belt-shaped electrodes 5 are formed on one major surface 1a of the first substrate 1, and a liquid crystal layer 3 comprised of a nematic liquid crystal, etc. is arranged in contact with the electrodes 5. This liquid crystal layer 3 is held between a thin dielectric film 6 comprised of glass, mica, or plastic, etc., and the first substrate 1. In this embodiment, there is employed a configuration in a form of a liquid crystal cell constituted by the first substrate 1, the liquid crystal layer 3, and the dielectric film 6.

The above-mentioned dielectric film 6 functions as an insulating shield layer of the liquid crystal layer 3 and the discharge region 4. If there is no dielectric film 6, there is the possibility that the liquid crystal material may flow into the discharge region 4, or the liquid crystal material may be contaminated by gas within the discharge region 4. It is to be noted that in the case where a solid-state or encapsulated electro-optical material, etc. is used in place of the liquid crystal material, there are instances where a dielectric film 6 is not required.

In addition, since the dielectric film 6 is formed by dielectric material, the dielectric film 6 itself also functions as a capacitor. Accordingly, in order to sufficiently ensure the electric coupling between the discharge region 4 and the liquid crystal layer 3, and to suppress a two-dimensional diffusion of charges, it be desirable that the dielectric film 6 is as thin as possible.

On the other hand, discharge electrodes 7 are formed as belt-shaped electrode also on the second substrate 2. Further, by supporting the peripheral portions of the second substrate 2 by means of spacers 8, a predetermined spacing from the dielectric film 6 exists. Thus, a space between the second substrate 2 and the dielectric film 6 serves as a discharge chamber 4 for generating discharge plasma. Accordingly, the discharge regions 4 form a continuous space in the entire display area. More particularly, the discharge chamber 4 has a plurality of scanning units, and each of the scanning units comprises a discharge region of a localized volume of ionized gas. While, in this embodiment, the discharge region of all scanning units is formed as a continuous space as described above, each scanning unit may comprise a discharge region of a localized volume of ionized gas so that at least two scanning units are formed as a continuous space.

Ionizable gas is fills the discharge regions 4. As the ionizable gas, helium, neon, argon, mixture gas thereof, or the like may be used.

The outline of the configuration of the electro-optical device applied to an image display device of this embodiment has been described as above. On the respective substrates 1 and 2, electrodes for driving the liquid crystal layer 3 are formed, respectively. The configuration of these electrodes and the display operation will now be described.

On the major surface 1a of the first substrate 1 which is opposite to the second substrate 2, a plurality of belt-shaped electrodes 5 having a predetermined width are formed in a manner such that they do not overlap each other. These electrodes 5 are formed by a transparent conductive material, e.g., Indium Tin Oxide (ITO), etc., and are optically transparent. Further, the respective electrodes 5 are parallel to each other and are perpendicular to, e.g., the display surface.

On the other hand, also on the major surface 2a of the second substrate 2 which is opposite to the first substrate 1", discharge electrodes 7 are similarly formed in such a manner that they do not overlap each other. These discharge electrodes 7 are parallel linear electrodes, but they are arranged in a direction perpendicular to the electrodes 5 formed on the first substrate 1. Namely, the discharge electrodes 7 and the electrodes 5 are in a form such that they constitute a simple XY matrix.

Further, as the discharge electrode 7, single electrodes A, B, C and D are arranged in correspondence with respective scanning units. These electrodes function as anodes or cathodes.

Figure 3:
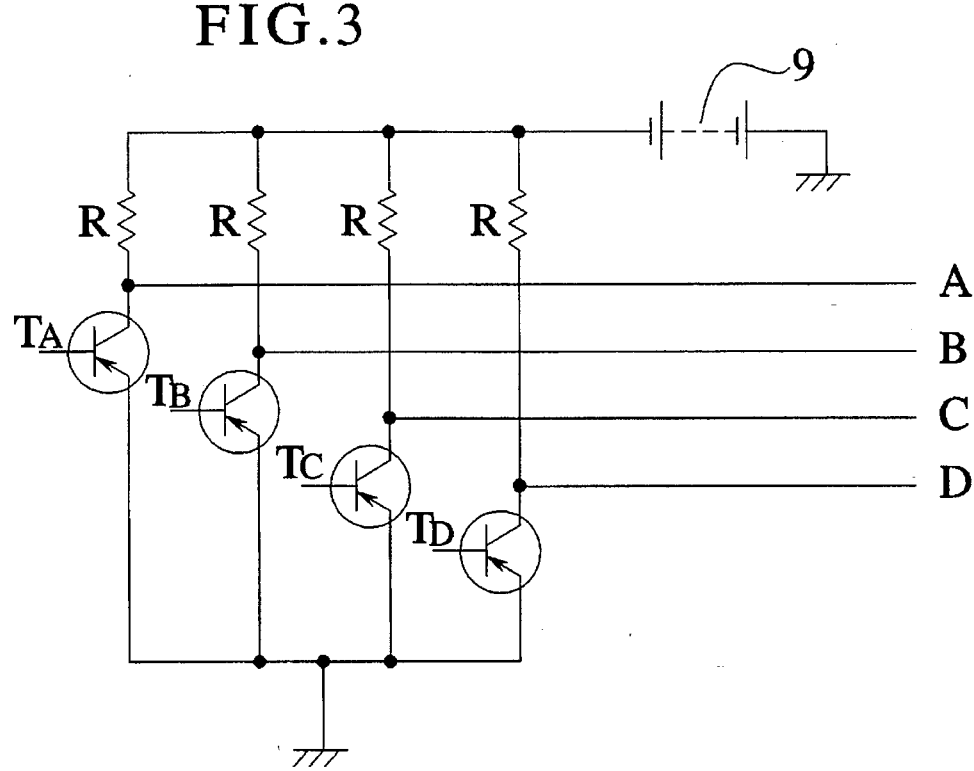
FIG. 3 is a circuit diagram showing a drive circuit for discharge electrodes.

The connecting state of the discharge electrodes 7 is shown in FIG. 3. Here, explanation will be given for an example of a drive circuit with respect to four lines.

The electrodes A, B, C and D are respectively connected to a d.c. power supply 9 through resistors R, and are commonly grounded through drive transistors $T_A$, $T_B$, $T_C$ and $T_D$.

Figure 4:
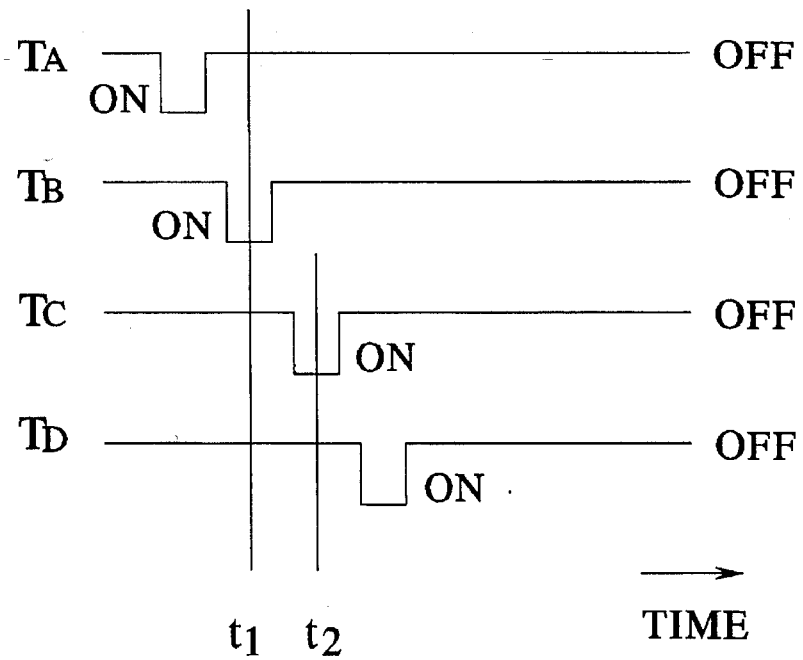
FIG. 4 is a waveform diagram of signals delivered to drive transistors for discharge electrodes.

Signals for ON/OFF in sequence are applied to respective drive transistors $T_A$, $T_B$, $T_C$ and $T_D$ as shown in FIG. 4.

Consider the operation at time $t_1$. At the time $t_1$, since the drive transistor $T_B$ is turned ON, the electrode B is grounded, and a negative voltage is applied to the other electrodes A, C and D by the pull-up resistors R.

Accordingly, at time $t_1$, the electrode B operates as an anode, and the electrodes A, C and D operate as cathodes.

If the kind or the pressure of the gas to the discharge chamber 4, and if the distances between electrodes A, B, C and D and the drive voltages thereof, etc. are suitably selected, discharge takes place between the electrodes B and A, and between the electrodes B and C. Thus, discharge plasma is produced.

At time $t_2$, the transistor $T_C$ is turned ON, and the other drive transistors $T_A$, $T_B$ and $T_D$ are turned OFF. As a result, the electrode C operates as cathodes, and the electrodes B and D operate as cathodes. Accordingly, discharge takes place between the electrodes C and B, and between the electrodes C and D. Thus, the discharge area is shifted by one scanning unit.

By applying such a signal ON/OFF in a time series manner to drive transistors $T_A$, $T_B$, $T_C$ and $T_D$ in the manner stated above, the discharge plasma region is shifted in succession, and is scanned on the display surface.

In the image display device of the above-described structure, image display is carried out on the basis of the fundamental principle that the liquid crystal 3 function as a sampling capacitor of an analog voltage applied to the electrodes 5 formed on the first substrate 1, and discharge plasma regions produced in succession in the discharge regions function as sampling switches.

This image display operation will now be described. The liquid crystal layer 3 corresponding to respective pixels can be viewed as a capacitor model, and indicate a capacitive liquid crystal cell formed at the portion where the electrodes 5 and the discharge plasma region overlap each other.

It is now assumed that an analog voltage is applied to respective electrodes 5 by means of a data driver circuit. If no discharge plasma takes place in the vicinity of the discharge electrodes 7 of the second substrate 2, a plasma switch (electrical connection between electrodes 5 and discharge electrode 7 serving as an anode) is placed in an OFF state. Accordingly, even if any analog voltage is applied to the electrodes 5, there is no change in the potential differences applied to respective capacitor models.

On the other hand, when a discharge plasma takes place in the vicinity of the discharge electrodes 7 of the second substrate 2, the electrode and the discharge electrode 7 serving as an anode (e.g., electrode B at time $t_1$) are placed in an electrically connected state. From a viewpoint of the circuit, there results the state equivalent to the state where the plasma switch is turned ON.

As a result, an analog voltage delivered to the electrode 5 is stored in the capacitor model. Even after such a discharge plasma is dissipated, this analog voltage remains in the state where it is stored in each capacitor model for a time period until a next strobe operation is carried out (during at least one field interval of that image), and does not influence of subsequent changes of an analog voltage applied to the electrode 5.

Accordingly, when ON/OFF signals are applied in a time sequential manner to the drive transistors $T_A$, $T_B$, $T_C$ and $T_D$, and a liquid crystal drive signal is applied as an analog voltage to the respective electrodes 5 in synchronism with application of the ON/OFF signals, the plasma switch functions as an active element in the same manner as the semiconductor element such as a thin film transistor, etc. Thus, the liquid crystal 3 is driven in a manner similar to the case of the active matrix addressing system.

Meanwhile, in the case of this example, at an arbitrary point within an effective picture, a plurality of discharges are necessarily carried out within one field. The number of discharges is two or more although it depends upon the spread of the discharge plasma region.

This might apparently result of degradation in the resolution, but it can be neglected for the following reasons.

Let now consider the case where the number of the scanning lines is assumed to be 400, and a non-interlaced operation is conducted. Further, consideration is now made in connection with a point in the vicinity of the electrode C as an example of an arbitrary point within an effective picture.

It is here assumed that, in the vicinity of the electrode C, when the drive transistors $T_B$, $T_C$ and $T_D$ are turned ON, supply of charged particles followed by plasma discharge is carried out. Namely, in the vicinity of the electrode C, three addressing operations are assumed to be carried out within one field.

Thus, data at the time when the drive transistor $T_B$ is turned ON (which is assumed as data B), data at the time when the drive transistor $T_C$ is turned ON (which is assumed as data C), and data at the time when the drive transistor $T_D$ is turned ON (which is assumed as data D) are sequentially written into the liquid crystal layer 3 at the portion opposite to the electrode C.

It is to be noted that, in the vicinity of the electrode C, the data B is erased by writing of the data C, and the data C is erased by writing of the data D. On the contrary, data D is left until the next field.

Accordingly, the data B and C is held for a time period of $1/400$ of one field, and the data D is held for a time period of $397/400$ of one field.

Namely, data actually effective or valid as an image is the data D finally written. In this case, crosstalk of $3/400 = 0.75\%$ only takes place. Even if the discharge plasma region further spreads, spread corresponding to 12 lines is required in order to cause a crosstalk of 3%. This is in fact negligible.

As stated above, in the image display device of this embodiment, the number of electrodes required to provide the same resolution can be reduced by one half. For this reason, not only production but also the transmissivity when used as an optical shutter can be improved. As a result, a bright image display can be realized.

Further, when the number of electrodes is assumed to be fixed, the resolution can become equal to a value twice greater than that of the prior art. Thus, the picture quality can be remarkably improved.

Figure 5:
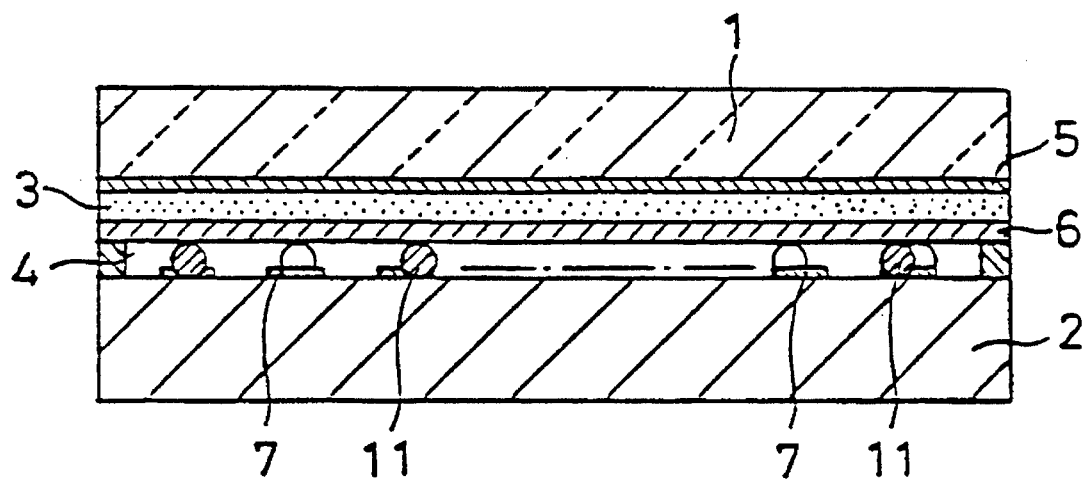
FIG. 5 is an essential part schematic cross sectional view showing another embodiment of an image display device to which an electro-optical device according to this inventions applied.
Figure 6:
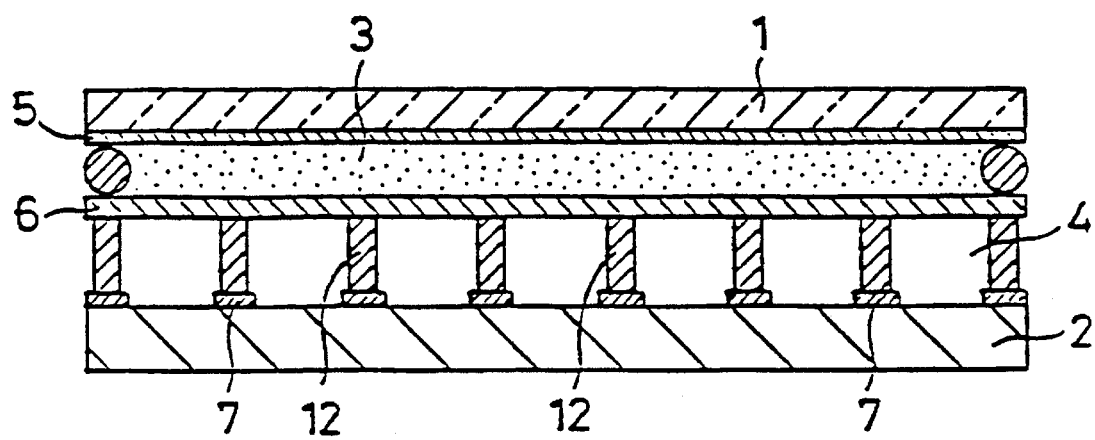
FIG. 6 is an essential part schematic cross sectional view showing a further embodiment of an image display device to which an electro-optical device according to this invention is applied.
Figure 7:
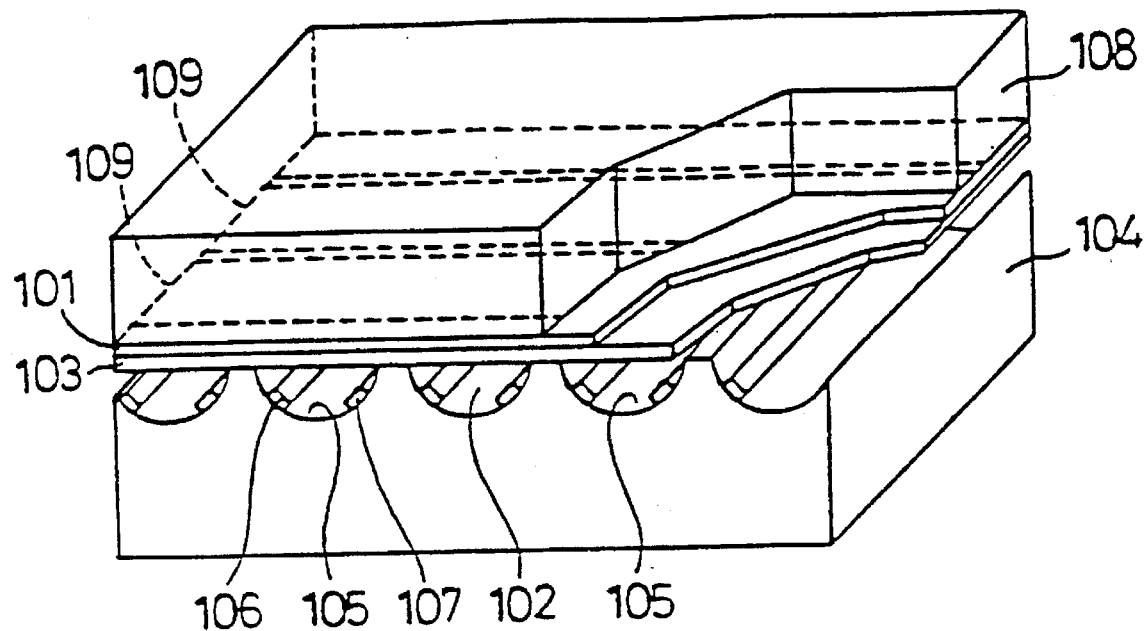
FIG. 7 is an essential part enlarged cross sectional view showing, in a partially broken manner, one example of conventional image display devices.

It is a matter of course that, while explanation has been given in connection with the embodiment to which this invention is applied, this invention is not limited to this embodiment. For example, while the image display device of the above-described embodiment is of the open-cell structure, there may be employed an image display device of a structure such that, for example, as shown in FIG. 5, the gap interval between discharge regions 4 is caused to be maintained with high accuracy, and to have an improved mechanical strength by fine particle 11 sprayed on the discharge electrodes 7. Alternatively, as shown in FIG. 6, there may be employed an image display device of a structure such that partition walls 12 are formed by the printing method on discharge electrodes 7, thus to divide the discharge region 4 every scanning unit.

As is clear from the foregoing description, when the electro-optical device according to this invention is applied to an image display device, the number of electrodes required for discharge can be reduced to one half. Thus, not only the transmissivity can be improved, but also electrodes can be connected out with ease.

In addition, when consideration is made of connections with the case where an image display device of this invention and that of the prior art have the same number of electrodes, a number of scanning lines which is twice greater than that of the prior art can be realized. Thus, the resolution can be remarkably improved.

What is claimed is:

1. An open cell electro-optical device comprising:

a first substrate which has a plurality of non-overlapping first electrodes formed on a major surface thereof;

a second substrate which is opposed to the first substrate and which has a plurality of non-overlapping second electrodes formed on a major surface thereof, the second electrodes being mounted at equal intervals and disposed substantially perpendicular to the first electrodes;

fine beads mounted on said second electrodes;

an electro-optical material layer mounted between the first and second substrates; and a continuous space discharge chamber formed between said electro-optical material layer and the second substrate, and said discharge chamber filled with an ionizable gas.

2. An electro-optical device comprising:

a first substrate which has a plurality of non-overlapping first electrodes formed on a major surface thereof;

a second substrate which is opposed to the first substrate and which has a plurality of non-overlapping second electrodes formed on a major surface thereof, the second electrodes being disposed substantially perpendicular to the first electrodes and positioned at equal intervals, so that any adjacent second electrodes constitute a pair of discharge electrodes;

an electro-optical material layer positioned between the first and second substrate;

a discharge chamber formed between the electro-optical material layer and the second substrate, and containing an ionizable gas, wherein said discharge chamber comprises a plurality of scanning units, each of the scanning units being formed by plasma discharge between adjacent pairs of the second electrodes; wherein said second electrodes are arranged in the second substrate so that all of the scanning units are formed as a continuous space;

a dielectric material layer positioned between the electro-optical material and the discharged chamber;

further including partition walls formed on the second electrodes so as to support the dielectric material layer;

further including fine beads formed on the second electrodes so as to support the dielectric material layer;

wherein the distance between adjacent second electrodes determines a distance of a scanning unit;

wherein said electro-optical material layer comprises a liquid crystal; and wherein said discharge electrodes comprise a pair of anode and cathode electrodes.

3. An electro-optical device comprising:

a first substrate which has a plurality of non-overlapping first electrodes formed on a major surface thereof;

a second substrate which is opposed to the first substrate and which has a plurality of non-overlapping second electrodes formed on a major surface thereof, the second electrodes being disposed substantially perpendicular to the first electrodes and positioned at equal intervals, so that any adjacent second electrodes constitute a pair of discharge electrodes;

an electro-optical material layer positioned between the first and second substrate;

a discharge chamber formed between the electro-optical material layer and the second substrate, and containing an ionizable gas, wherein said discharge chamber comprises a plurality of scanning units, each of the scanning units being formed by plasma discharge between adjacent pairs of the second electrodes; wherein said second electrodes are arranged in the second substrate so that all of the scanning units are formed as a continuous space;

a dielectric material layer positioned between the electro-optical material and the discharge chamber;

further including partition walls formed on the second electrodes so as to support the dielectric material layer;

wherein the distance between adjacent second electrodes determines a distance of a scanning unit;

wherein said electro-optical material layer comprises a liquid crystal; and wherein said discharge electrodes comprises a pair of anode and cathode electrodes.

* * * * *